July 23, 1968

M. HANAYA 3,393,942

METHODS AND APPARATUS FOR PNEUMATICALLY HANDLING BULK MATERIAL

Filed Jan. 12, 1967

United States Patent Office 3,393,942
Patented July 23, 1968

3,393,942
METHODS AND APPARATUS FOR PNEUMATICALLY HANDLING BULK MATERIAL
Morimasa Hanaya, Kure-shi, Japan, assignor to Toyo Pulp Co., Ltd., Tokyo, Japan, a corporation of Japan
Filed Jan. 12, 1967, Ser. No. 608,818
Claims priority, application Japan, Jan. 14, 1966, 41/2,090
4 Claims. (Cl. 302—49)

ABSTRACT OF THE DISCLOSURE

Methods and apparatus for directly scraping up bulk material from a stack of such material for pneumatically handling the material. The apparatus has a substantially cylindrical casing provided with a bulk material intake opening, an impeller rotating in sliding contact with inner walls of the casing and having blades with cutters on their outer ends, and a pneumatic transport pipe connected to the casing so that those blades protruding from the opening can directly scrape up the material. The pneumatic transport pipe is so positioned that it is always air-locked from the intake opening by the rotating blades.

---

This invention relates to methods and apparatus for continuously scraping up a substantially predetermined quantity of lump-like or granular material from a stack of bulk material such as for example, wood chips, coal, coke, earth and sand, grain, rice, sugar or salt, and pneumatically conveying such bulk material to a remote place or station.

Conventional bulk pneumatic unloading systems have been invariably equipped with a tubular type of intake suction nozzle and a bulk material transport pipe which is supported by a hoist or like means. Such a conventional pneumatic unloading system has been difficult to operate with a large handling capacity because of the fact that the nozzle tip must be manually operated for the suction of bulk material and therefore there is a certain limitation in the weight of the nozzle. Furthermore, the suction nozzle in such a conventional handling system can only apply suction to a bulk material lying in loose state and has no capability of tearing down or breaking a stack of bulk material. Consequently, the suction nozzle is not able to handle bulk material of a binding nature which has an uncertain repose angle and its handling capacity is prone to variation, with the result that power is uselessly lost and the loading or unloading operation is liable to become excessively discontinuous. In some cases, lump-like or granular material may block the suction nozzle which is thereby rendered inoperative.

It is therefore a primary object of the present invention to provide novel methods and aparatus for the pneumatic handling of bulk material by which the difficulties encountered with the prior pneumatic handling system can be entirely obviated. The apparatus according to the present invention is provided with an impeller having a plurality of blades whose radially outer ends are in the form of a sharp cutter so that each blade of the impeller can continuously and forcedly scrape up a substantially predetermined quantity of lump-like or granular material from a stack of bulk material for the pneumatic conveyance of such bulk material to a remote station. Moreover, the sharp cutters at the outer ends of the impeller can dig through a bulk material of a binding nature or even of coherent nature. The rotary nozzle apparatus in the invention is quite free from any useless pressure losses at the mixing section and also free from any fluctuation in the handling capacity unlike the case with the prior tubular nozzles, and can thus improve the handling capacity per horsepower consumed for the pneumatic handling and increase the mixing ratio for thereby remarkably increasing the transport capacity.

Another object of the present invention is to provide a rotary nozzle apparatus for the pneumatic handling of a bulk material which can be suitably mounted on carriers such as bulldozers, cranes, motor cars, hoists, reclaimers and the like for thereby overcoming the limitation of handling capacity experienced with the prior manually operated tubular nozzles.

The above and other objects, advantages and features of the present invention will become apparent from the following description with reference to the accompanying drawings, in which.

The present invention provides a novel method and apparatus for pneumatic handling of a bulk material, in which an impeller adapted to slidingly rotate in a substantially cylindrical casing is driven to scrape up a quantity of bulk material from a stack of bulk material even if it may be of binding nature and tear down or break a stack of bulk material to forcedly take a quantity of such material into the casing through its intake opening for the subsequent pneumatic transport of bulk material to a desired destination.

The invention having the above-described features will be described in detail with reference to the drawings.

Figure 1:
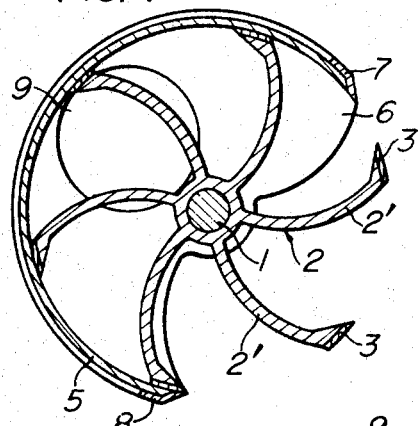
FIG. 1 is a vertical sectional view of a preferred embodiment of the apparatus according to the present invention.
Figure 3:
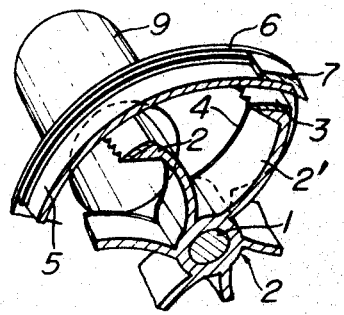
FIG. 3 is a perspective view of part of the apparatus, showing the internal structure thereof.
Figure 2:
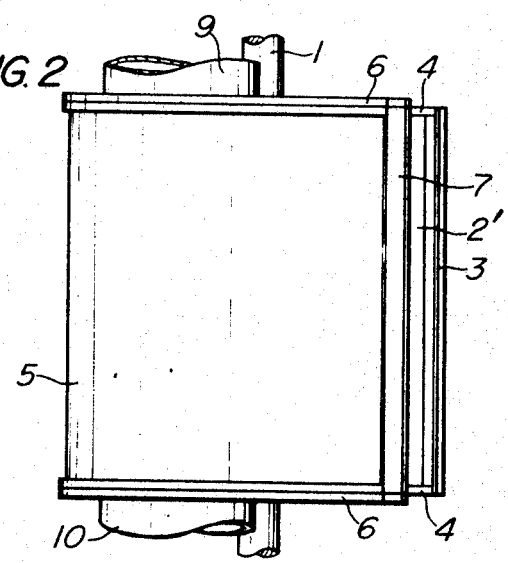
FIG. 2 is a top plan view of the apparatus shown in FIG. 1.

Referring to FIGS. 1, 2 and 3, the rotary nozzle apparatus according to the present invention includes an impeller 2 which consists of a plurality of blades 2' mounted in substantially equally spaced relation on a rotary shaft 1 for rotation therewith and radially outwardly extending to terminate closely adjacent to the lined inner peripheral wall of a substantially cylindrical casing. A cutter liner 3 is fixed to the radially outer end of each blade 2' and has a sharp edge or claw as best seen in FIG. 3. A pair of side liners 4 are fixed to opposite sides of each blade 2' so that the blade 2' can serve as a material scooping means and make sliding and sealing contact with the side plates of the casing. The casing consists of a section substantially cylindrical body 5 and side plates or covers 6 of a shape conforming to the sectional shape of the body 5 so as to define a bulk material intake opening of arcuate shape on the uncovered or open peripheral section of the casing. Aligned apertures are bored through the side plates 6 and an air flow pipe 9 and a material transport pipe 10 are respectively connected to these apertures. The apertures are located at positions sufficiently inwardly remote from the bulk material intake opening of the casing so that, before one of the rotary blades 2' can reach the apertures, the succeeding blade 2' can be brought into sliding contact with the inner peripheral walls of the casing to ensure absence of any communication between the intake opening and the apertures to which the air flow and material transport pipes 9 and 10 are connected. Suction may be applied to the pipe 10 or high pressure air may be forced into the pipe 9 for the pneumatic transport of bulk material scooped into the rotary nozzle apparatus to a desired place. Doctor blades 7 and 8 are provided on the opposite end edges of the intake opening of the casing for slidingly contacting with the cutter liners 3 of the moving blades 2' to ensure reception of a substantially predetermined quantity of bulk material in each space defined between the adjacent blades 2'.

Figure 4:
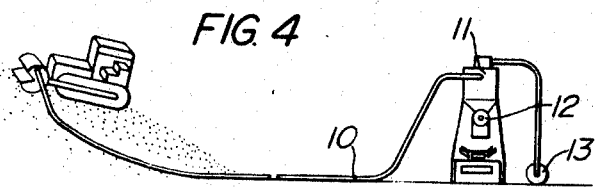
FIG. 4 is a diagrammatic view of a pneumatic handling system in which the apparatus of the invention is shown connected to a bulldozer and a suction blower for the transport of a granular material stacked in bulk into a receiver tank.

One application of the present invention is shown in FIG. 4 in which it will be seen that the rotary nozzle apparatus is connected to a bulldozer and the transport pipe 10 is connected to a reeciver tank 11 equipped with a rotary feeder 12 and a suction blower 13. It will be readily apparent that, when the impeller 2 is driven from the moving bulldozer, lump-like or granular material stacked in bulk on a yard can be continuously transported into the receiver tank 11 and then conveyed to a desired place for subsequent treatment or packaging.

The present invention having the above features exhibits the following notable advantages over the prior are pneumatic transport system:

(1) *Transportability of predetermined quantity.*—The prior tubular type of intake suction nozzle has had a poor transport efficiency in case of operation with a bulk material of strongly binding nature or which has an uncertain repose angle because incessant variation in the distance between the material and the nozzle tip has resulted in a varying capacity of handling and useless consuption of power.

However, in the invention, the impeller with the cutters thereon can forcedly and constantly scrape up a predetermined quantity of bulk material for the pneumatic transport thereof. Therefore a maximum transport capacity can be maintained and stable loading or unloading can be accomplished.

(2) *Reduction in pressure losses.*—Basically the required air velocity in the prior tubular nozzle tip is much higher than that of this invention owing to the suction of a fixed bulk materials on the ground.

Also, the prior tubular nozzle has been provided with a secondary air port in order to prevent clogging by the bulk material at the suction port which is simultaneously used for the suction of air. In this prior arrangement, in order to maintain the required velocity of suction at a suction port of the nozzle tip, the air velocity at a point downstream of the secondary suction port had to be quite higher than required and the excessive pressure loss resulted in useless consumption of power.

In the present invention, a predetermined quantity of bulk material can always be forcedly supplied in suspended form to the air stream of the suction aperture. By virtue of the above feature, a lowest air velocity that may be sufficient for the transport can successfully transport any bulk material and thus there is no useless pressure losses in the system.

(3) *Increased solid-air mixture ratio.*—Due to the above excessive pressure losses encountered with the use of the prior tubular nozzle, the solid-air mixture ratio of bulk material to air in the prior nozzle was excessively low in case of suction type of transport compared with forced feed type of transport.

In the invention, however, the fact that a predetermined quantity of bulk material can always be forcedly supplied in suspended form to the air stream of the suction aperture ensures the operation at a high solid-air mixture ratio comparable to the case of forced feed, which increases the capacity of bulk material that can be transported and provides an improvement in the economy of loading and unloading by means of pneumatic handling.

(4) *Successful pneumatic handling of bulk material of strongly binding nature.*—The prior tubular nozzle has been utterly unable to handle a bulk material such as, for example, wood chips, salt or concentrated lumps of nonferrous metal which has a strongly binding property or, in an excessive case, tends to cohere together.

In the invention, however, the cutters on the impeller can dig up such a bulk material of strongly binding or coherent nature for the forced transport of a predetermined quantity of bulk material irrespective of the nature of the material.

(5) *Remarkable increase in the handling capacity.*—In the case of the prior tubular nozzle, man power had to be resorted to for the operation of the nozzle and the nozzle weight has set up a certain limit in the handling capacity.

However, by virtue of the fact that the rotary nozzle apparatus of the present invention is adapted to be mounted on a carrier such, for example, as a bulldozer, crane, motor car, hoist or reclaimer, the limitation in the handling capacity with the prior tubular nozzle is overcome and a remarkable increase in the transport capacity can be realized.

(6) *Success in the forced transport of material.*—In view of the tubular structure of the prior nozzle, the prior nozzle has been solely used for the pneumatic transport by means of suction. Therefore, a suction equipment consisting of a suction blower, receiver tank and a rotary feeder had to be disposed at the destination of the transport and there has been a certain limitation in the use of the prior nozzle.

In contrast thereto, forced transport of bulk material can be realized by the rotary nozzle apparatus of the invention which is also provided with the function of a rotary feeder. The apparatus of the invention is therefore usable for a wide variety of services.

What I claim is:

1. A pneumatic bulk material conveying apparatus of the traveling type for pneumatically conveying bulk material through a pneumatic conveyor line comprising in combination a rotatable impeller including a rotatable shaft, a plurality of blades disposed at regular spaced intervals on said shaft, each of said blades being arcuate in section and curving upwardly and forwardly relative to the direction of rotation of the impeller and including a cutter liner having a sharp edge at its forward end and side liners on its opposite side edges, a cylindrical casing fitted over said impeller in enclosing relation, a vehicle connected to said casing to transport the same over the bulk material to be conveyed, said casing being formed with a bulk material intake opening in its lower portion facing in the direction of movement of the vehicle and doctor blades attached to lower end edges at said intake opening for gathering a quantity of bulk material in front of the casing, and doctor blades attached to upper end edges at said intake opening for engaging each said blade during rotation of the impeller, a pneumatic conveyor line connected to said casing and maintaining communication with the interior thereof through an aperture formed in one side wall of the casing, and an air inlet line connected to said casing and maintaining communication with the interior thereof through an aperture formed in the other side wall of the casing, said pneumatic conveyor line and said air inlet line opening substantially in lateral alignment in the casing at positions where they communicate with each other via a sealed chamber formed by said blades and casing whereby the bulk material intake opening is isolated from the pneumatic conveyor line and the air inlet line.

2. Apparatus as claimed in claim 1, wherein said side walls of said casing are cut out to provide said bulk material intake opening.

3. Apparatus as claimed in claim 1 wherein said openings of said lines in said casing are in diagonal opposition to the intake opening in the casing.

4. A method of conveying bulk material pneumatically through a pneumatic conveyor line connected to a pneumatic bulk material conveying apparatus of the traveling type, said method comprising continuously moving such apparatus over a stack of bulk material while gathering a quantity of such bulk material by continuously scraping up successive discrete quantities of said quantity of bulk material from said stack of bulk material, transporting the successive discrete quantities of bulk material into a space which is sealed from the ambient atmosphere; each discrete quantity of material being scraped and shifted upwardly from a lower level to an upper level whereat the material is freely deposited into said space to fall downwardly by gravity, producing a laterally flowing airstream in said space to cause the bulk material to be transported in said airstream, and connecting a pneumatic conveyor line to said space for the conveyance of the bulk material through said conveyor line.

References Cited

UNITED STATES PATENTS

| | | | |
|---|---|---|---|
| 1,143,634 | 6/1915 | Lane et al. | 302—49 X |
| 1,385,870 | 7/1921 | Gieseler. | |
| 2,084,764 | 6/1937 | Constantin | 302—49 |
| 2,627,155 | 2/1953 | Shuler et al. | |
| 3,268,266 | 8/1966 | Brown | 302—49 |

FOREIGN PATENTS 195,302  3/1965  Sweden.

EVON C. BLUNK, *Primary Examiner.*

M. L. AJEMAN, *Assistant Examiner.*